US005735151A

United States Patent [19]
Nickeas et al.

[11] Patent Number: 5,735,151
[45] Date of Patent: Apr. 7, 1998

[54] ANTI-THEFT DEVICE FOR MOTOR VEHICLES

[76] Inventors: Mark Nickeas, 30816 Whim Dr., Westlake Village, Calif. 91362; Martin Nickeas, 631 Oakrun #209, Agoura Hills, Calif. 91362

[21] Appl. No.: 706,617

[22] Filed: Sep. 6, 1996

Related U.S. Application Data

[63] Continuation of Ser. No. 334,410, Nov. 4, 1994, abandoned.

[51] Int. Cl.⁶ ........................................... B60R 25/02
[52] U.S. Cl. ................ 70/221; 70/188; 70/218; 70/252
[58] Field of Search ............ 70/218, 221–224, 70/237, 239, 252, 210, 215–217, 188, 189; 74/552; 180/287

[56] References Cited

U.S. PATENT DOCUMENTS

| | | | |
|---|---|---|---|
| 1,300,505 | 4/1919 | Stanley | 70/189 X |
| 1,346,815 | 7/1920 | Fraser | 70/218 X |
| 1,515,809 | 11/1924 | Eckenroad | 70/221 |
| 1,578,782 | 3/1926 | Truman | 70/221 |
| 1,657,402 | 1/1928 | Kenworthy et al. | 70/221 |
| 1,661,447 | 3/1928 | Seng | |
| 1,672,137 | 6/1928 | Seng | 70/221 |
| 1,699,973 | 1/1929 | Kenworthy | 70/216 X |
| 4,659,244 | 4/1987 | Malvy et al. | 74/552 X |
| 4,811,580 | 3/1989 | Jang | 70/189 X |
| 4,901,544 | 2/1990 | Jang | 70/218 |
| 4,924,685 | 5/1990 | Usina | 70/218 |
| 4,934,479 | 6/1990 | Usina | 70/252 X |
| 5,216,908 | 6/1993 | Malvy | 70/218 |
| 5,345,797 | 9/1994 | Hayes | 70/218 |

FOREIGN PATENT DOCUMENTS

| | | | |
|---|---|---|---|
| 2569147 | 2/1986 | France | |
| 500958 | 6/1930 | Germany | 70/218 |

*Primary Examiner*—Suzanne Dino
*Attorney, Agent, or Firm*—Lyon & Lyon LLP

[57] ABSTRACT

An anti-theft device for motor vehicles which selectively disables the vehicle by interrupting the operative connection of the steering wheel to the steering column. The device includes an outer cylindrical boss which is fixed to the steering wheel and rotatably mounted on and about an inner cylindrical boss affixed to the steering column. A key actuated locking mechanism is carried by the outer boss which selectively engages the inner boss to operatively connect the steering wheel to the steering column. By unlocking the locking mechanism, this operative connection is interrupted and the vehicle cannot be controlled by the steering wheel and is thus disabled. As the disabling of the vehicle is obtained when the locking mechanism is in an unlocked position as opposed to a locked position, damaging the mechanism by the application of excessive force will not overcome its disabling effects.

6 Claims, 3 Drawing Sheets

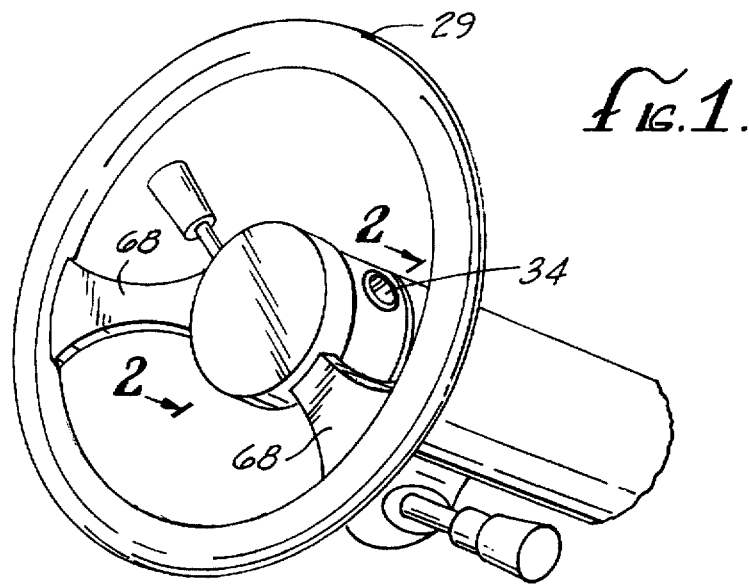
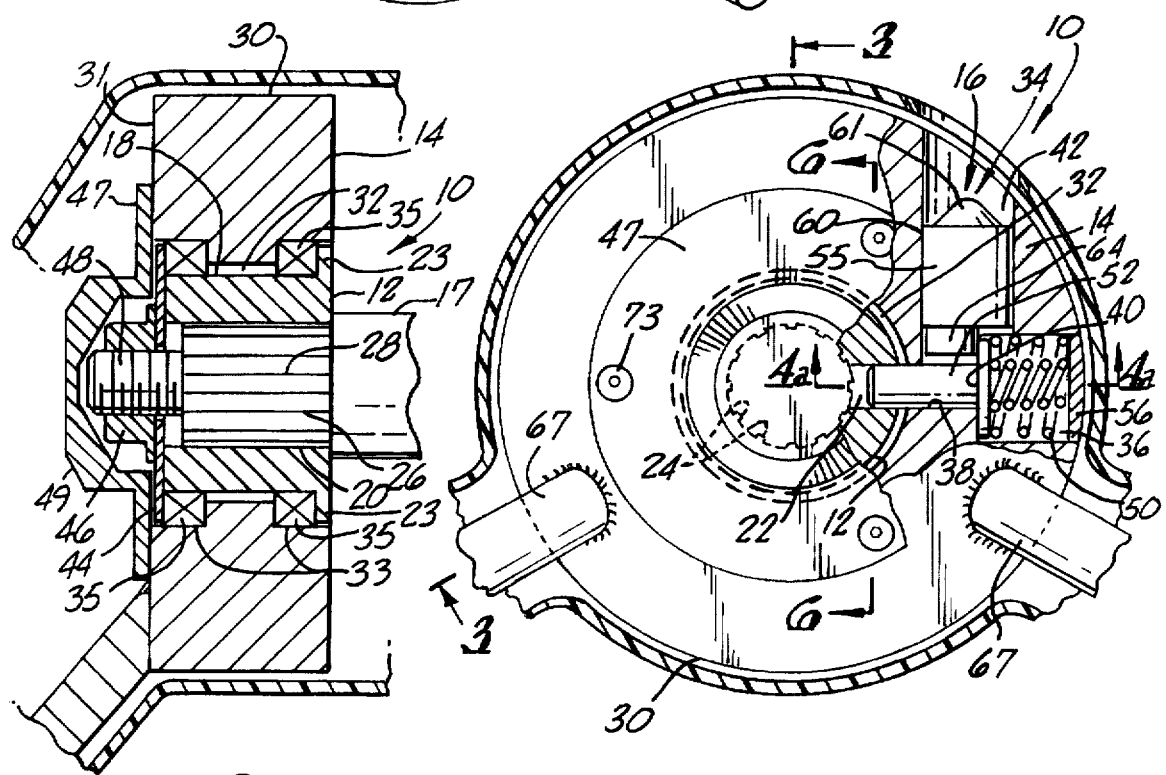

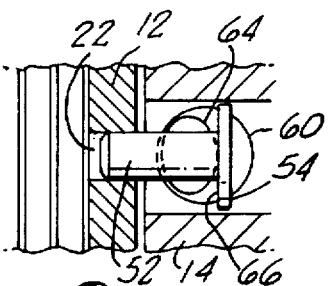 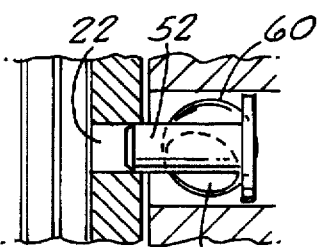 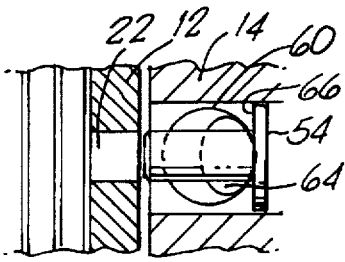
fig.4a.   fig.4b.   fig.4c.
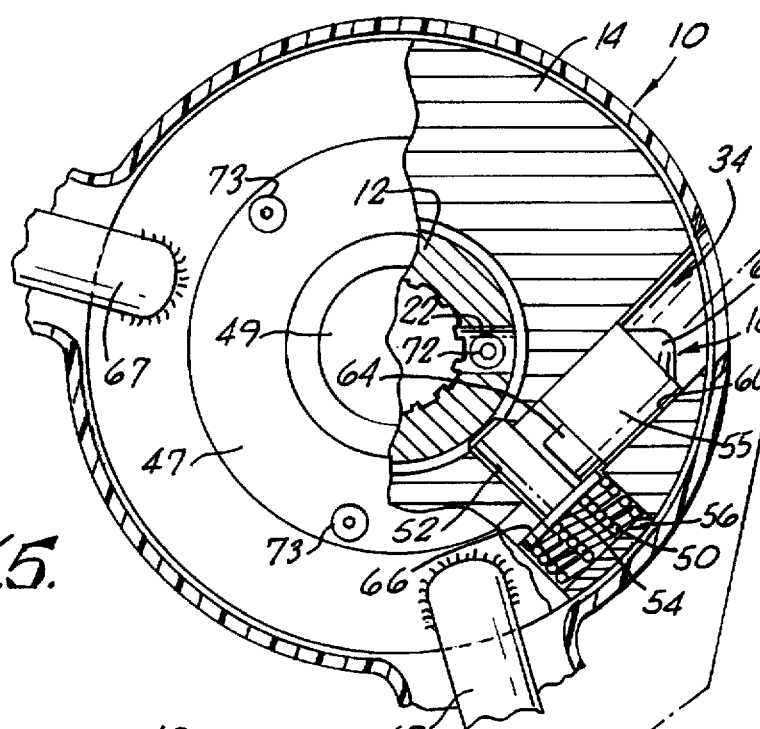
fig.5.
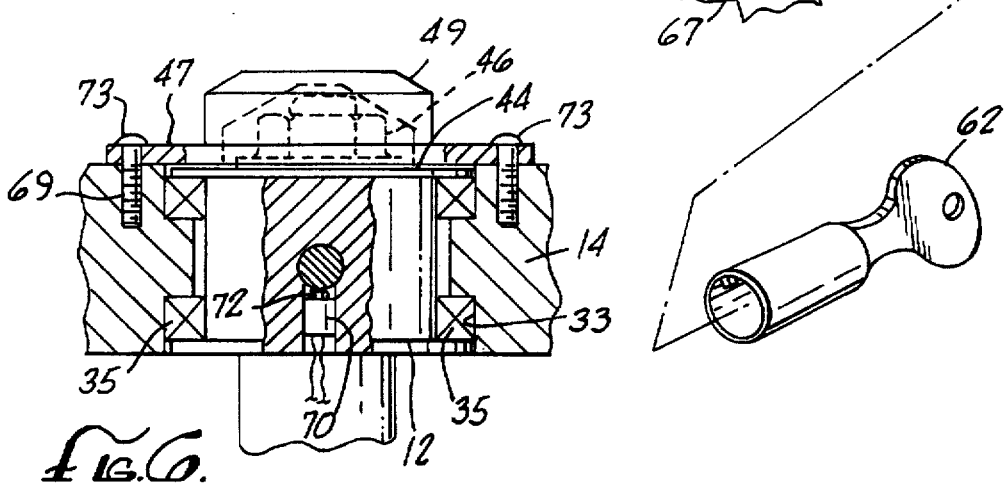
fig.6.

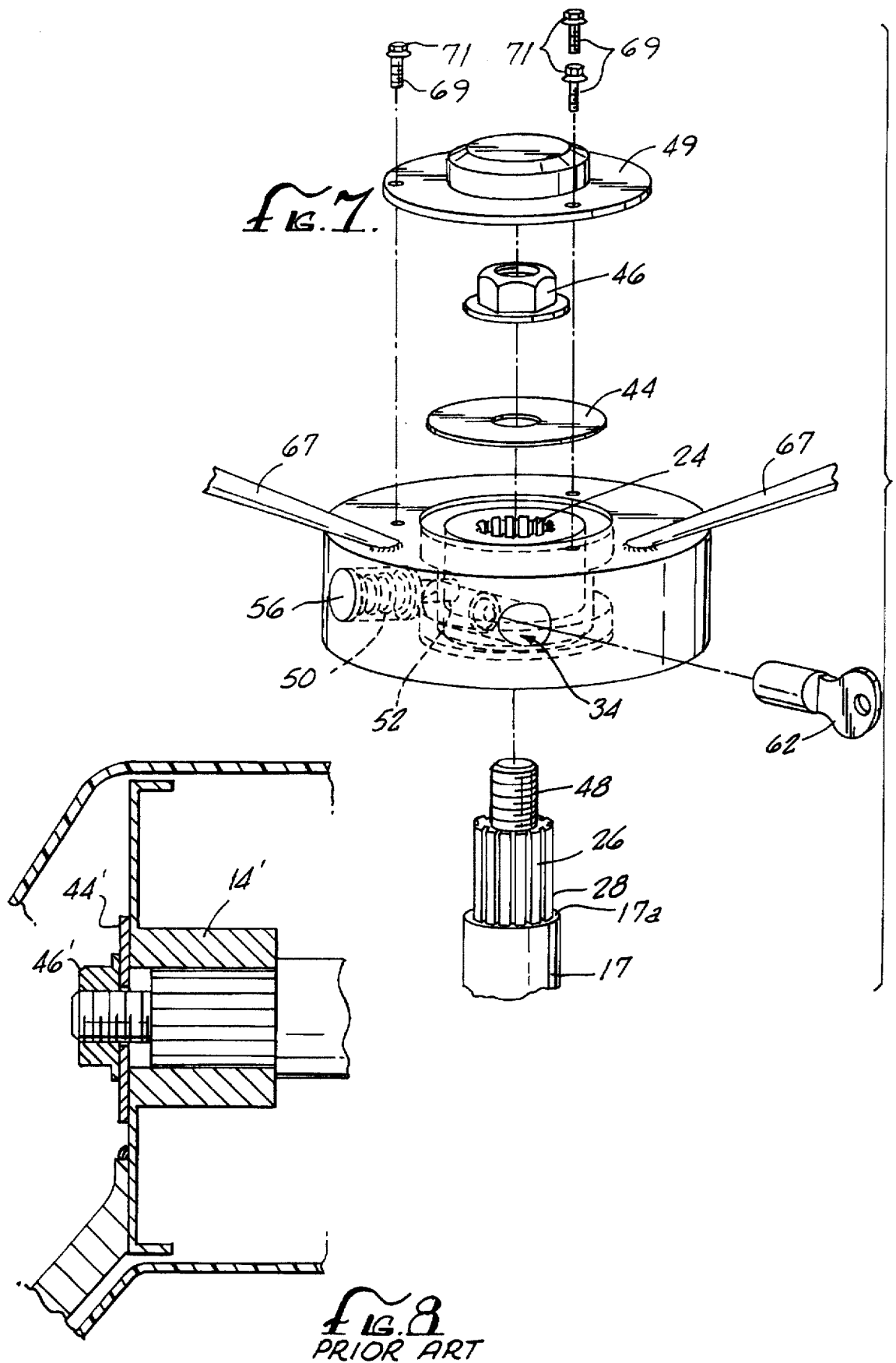

ANTI-THEFT DEVICE FOR MOTOR VEHICLES

This is a continuation of application Ser. No. 08/334,410, filed on Nov. 4, 1994, and now abandoned.

BACKGROUND OF THE INVENTION

In recent years, numerous different kinds of anti-theft devices have been developed to render automobiles more difficult to steal. Such devices range from very costly alarm systems equipped with a variety of sophisticated mechanisms for disabling the vehicle to the far less expensive steering wheel locking devices. The ease with which most such devices can be overcome or circumvented, however, has lead to the increasing popularity of automobile recovery devices employing radio transmitters despite their substantial costs and failure to prevent the theft in the first instance.

An automobile protection device should prevent the initial theft of the vehicle, preferably by disabling the vehicle as opposed to merely sounding an alarm. Auto alarms are often ignored and can generally be rather easily deactivated. Those which are more difficult to silence are generally too costly for most car owners and again are frequently ignored due to the frequency of false alarms. An anti-theft device should not only disable the vehicle when activated and be difficult to circumvent but also should be relatively inexpensive to manufacture and install so that most drivers could afford to equip their vehicles with such a device. The anti-theft device of the present invention possesses these attributes.

The automobile anti-theft devices which have been previously developed to provide such protection at a low cost typically employ a form of locking mechanism which disables the vehicle by preventing rotation of the steering wheel when the device is in the locked position. When faced when such devices, a thief will generally break the lock or cut through the steering wheel, depending on the nature of the device, and thereby circumvent the disabling mechanism. Unfortunately, this is usually a relatively simple task even for unsophisticated thieves and both easier and faster than attempting to "pick" the locking mechanism. While a variety of sophisticated yet relatively inexpensive locking mechanisms have been developed which are exceedingly difficult to open without the proper key or combination, the anti-theft devices employing such mechanisms can still be overcome by the appropriate application of a force sufficient to break the locking mechanism. If such devices were as difficult to break as they are to "pick", they would indeed provide excellent protection against automobile theft at a reasonable cost.

The anti-theft device of the present invention both effectively and economically disables a vehicle to prevent its unauthorized use by utilizing an essentially "pick-proof" locking mechanism so as to mechanically disable the vehicle when the mechanism is in the unlocked position, not the locked position. Accordingly, the application of excessive force to the anti-theft device of the present invention would simply leave the vehicle disabled.

SUMMARY OF THE INVENTION

Briefly, the automotive anti-theft device of the present invention comprises a locking mechanism carried by and disposed between the vehicle's steering wheel and steering column for selectively engaging and releasing the operative connection of the steering wheel to the steering column. The mechanism includes an outer cylindrical boss which is permanently affixed to the steering wheel and an inner cylindrical boss which is affixed to the extended end of the vehicle's steering column and rotatably disposed within the outer boss such that the outer boss and attached steering wheel are freely rotatable on and about the inner boss. A tamper-proof securement retains the inner boss within the outer boss to prevent unauthorized removal of the steering wheel from the steering column. A locking mechanism which is both tamper-proof and key actuated is provided in the outer boss which, in the locked position, physically couples the outer boss to the inner boss and thus operatively connects the steering wheel to the steering column for controlling the vehicle. In the unlocked position, the coupling of the outer boss to the inner boss provided the locking mechanism is released, leaves the steering wheel and outer boss attached to but free-wheeling on the inner boss, thus rendering the vehicle uncontrollable by means of the steering wheel and effectively inoperative. To prevent one from inadvertently attempting to drive the vehicle with the steering in such a condition, an ignition inhibitor switch is provided in the inner boss which opens the electrical circuit through the vehicle's ignition switch when the looking mechanism is in the unlocked position.

It is the principal object of the present invention to provide an improved anti-theft device for automobiles which effectively disables the vehicle in a manner which cannot readily be overcome or circumvented by a car thief.

It is another object of the present invention to provide automobiles which disables the vehicle in a manner which cannot be overcome or circumvented by the use of excessive force.

It is yet another object of the present invention to provide a highly effective anti-theft device for vehicles which is of simple construction and economical to manufacture and install.

It is a further object of the present invention to provide a highly effective anti-theft device for vehicles which can be provided on a vehicle as original equipment by the automobile manufacturers or readily added to a vehicle as an aftermarket product without interfering with the original equipment steering lock provided on the vehicle.

It is a still further object of the present invention to provide a highly effective anti-theft device for vehicles which is both easy to use and highly resistant to mechanical failure.

These and other objects and advantages of the present invention will become readily apparent from the following detailed description taken in conjunction with the accompanying drawings.

DESCRIPTION OF THE PREFERRED EMBODIMENT IN THE DRAWINGS

FIG. 1 is a perspective view of a steering wheel assembly equipped with the anti-theft device of the present invention.

FIG. 2 is a sectional view taken along the line 2—2 of FIG. 1.

FIG. 3 is a sectional view taken along the line 3—3 of FIG. 2.

FIGS. 4a–4c are sectional views as seen along the line 4a—4a of FIG. 2 and illustrate the operation of the camming mechanism in the use of the present invention.

FIG. 5 is a partial sectional view of the anti-theft device of the present invention illustrating the locking mechanism employed therein in the unlocked position and the use of a key to activate the locking mechanism.

FIG. 6 is a sectional view taken along the line 6—6 in FIG. 2 and illustrating the use of an ignition inhibitor switch.

FIG. 7 is an exploded view of the anti-theft device of the present invention.

FIG. 8 is a sectional view illustrating a conventional securement of a steering wheel to a steering column.

Referring now in detail to the drawings, the anti-theft device 10 of the present invention comprises a cylindrical inner boss 12, a cylindrical outer boss 14 and a key actuated locking mechanism 16 carried within the outer boss 14. The inner boss 12 is adapted to be mounted on and secured to the steering column 17 of the vehicle. Boss 12 is preferably constructed of high strength steel and defines a cylindrical outer surface 18, a substantially cylindrical and centrally disposed channel 20 extending axially therethrough, a cylindrical slot 22 extending radially from outer surface 18 to channel 20 and an annular bearing retention flange 23 adjacent one end thereof. A plurality of inwardly projecting ribs 24 are defined by the side wall of channel 20 which are adapted to mate with the conventional splines 26 provided on the end portion 28 of an automobile steering column 17, as shown in FIG. 7. Upon the inner boss 12 being so disposed over end portion 28, any rotational movement of the inner boss 12 is imparted directly to the steering column 17.

The outer boss 14 is secured to the vehicle's steering wheel 29 and rotatably mounted on and about the inner boss 12. The outer boss 14 is preferably formed of case-hardened steel and defines an outer cylindrical surface 30, an annular upper surface 31 and centrally disposed cylindrical channel 32 extending axially therethrough which is adapted to receive the inner boss 12 therein. A pair of annular recesses 33 are disposed in outer boss 14 adjacent the extended ends of channel 32 which contain bearings 35. Outer boss 14 also defines substantially "L"-shaped channel 34 therein extending between outer surface 30 and central channel 32 for housing the locking mechanism 16. Channel 34 defines a first outer radially extending portion 36, a second inner radially extending portion 38 communicating with and axially aligned with outer portion 36, an arcuate shoulder 40 disposed between channel portions 36 and 38, and a third channel portion 42 extending normal to and communicating with channel portions 36 and 38 as seen in FIGS. 2 and 5. The outer boss 14 is secured to a conventional steering wheel 29 by welding the steel bars 66 in the steering wheel arms 68 to the annular upper surface 31 of boss 14.

The central channel 32 in outer boss 14 is sized to define a diameter slightly greater than the outer diameter of the inner boss 12 so that the inner boss can be freely journaled in channel 32 within the outer boss 14 on bearings 35. In the preferred embodiment of the invention small tapered roller bearings are employed to avoid any "play" between the inner and outer bosses 12 and 14 and thus the play in the steering wheel. Standard roller bearings, open or closed, could also be employed however. As seen in FIG. 3, the bearings 35 are held between the bosses 12 and 14 in a press fit within the annular recesses 33 in outer boss 14, the upper bearing being substantially adjacent an annular mounting plate 44 and the lower bearing being substantially adjacent a bearing retention flange 23 formed at the lower end of inner boss 12. The mounting plate 44 extends over the upper end of inner boss 12 as well as the adjacent bearing 35 and cooperates with the standard steering column nut 46 and locking clip (not shown) to secure the inner boss within the outer boss and the anti-theft device 10 to the steering wheel column 17. Nut 46 threadably engages the reduced diameter end 48 of the steering wheel column 17 which projects through a central aperture in mounting plate 44, securing the inner boss 12 to the steering wheel column 17 between plate 44 and an annular shoulder 17a disposed at the lower end of the splined portion of the steering column. Nut 46 and mounting plate 44 also secure the inner boss 12 within channel 32 in the outer boss 14 such that the outer boss can rotate freely on and about the inner boss 12 with no "play" therebetween. As will be discussed later herein, nut 46 and plate 44 are preferably protected from tampering by a cap 49 formed of case-hardened steel and affixed to the outer boss 14 so as to cover nut 46 and plate 44.

The locking mechanism 16 is disposed within the "L"-shaped channel 34 in outer boss 14 and is key actuated to selectively couple and uncouple the outer boss 14 to the inner boss 12 and thereby control the operative connection between the vehicle's steering wheel 29 and the steering wheel column 17. Without such a connection, the steering wheel is merely free wheeling about the inner boss 12 and the vehicle is effectively disabled.

Locking mechanism 16 comprises a spring assembly 50, a cylindrical locking bolt 52 having a circular back plate 54 welded or otherwise affixed thereto, and a key actuated camming member 55. The spring assembly 50 is preferably comprised of a pair of helical springs, one disposed within the other to provide fail-safe operation. The spring assembly 50 is held in compression within the outer radial portion 36 of channel 34 between plate 54 and a channel sealing plug 56. Plug 56 is also formed of case hardened steel and, as will be discussed later herein, is welded or otherwise permanently affixed in place so as to seal and conceal the outer end of channel portion 36 after the locking bolt, back plate and spring assembly are inserted therethrough. So confined, the spring assembly 50 continually urges the locking bolt 52 inwardly toward the inner boss 14.

To control the movement of locking bolt 52, a key actuated camming member 55 is rotatably mounted in portion 42 of channel 34 in the outer boss 14. The camming member 55 includes a cylindrical key engagement portion 60 singularly configured to mate with key 62 within channel portion 42 to effect rotation of an elliptical cam 64 eccentrically mounted on the inner end 65 of the key engagement portion 60 of the locking mechanism. As spring assembly 50 continually urges the inner facing surface 66 of the locking bolt back plate 54 against cam 64, surface 54' functions as a cam follower and thus cooperates with cam 64 to effect linear movement of the locking bolt 52. Rotation of the key engagement portion 60 by key 62 in a first direction causes the eccentrically rotating cam 64 to move the locking bolt 52 from the extended or locking position illustrated in FIGS. 2 and 4a to that illustrated in FIG. 4b and finally to the retracted or unlocked position illustrated in FIGS. 5 and 4c. As the locking bolt is retracted within outer boss 14, the spring assembly 50 is compressed within channel 34. Counter-rotation of the key engagement portion 60 of locking mechanism 16 rotates cam 64 in the opposite direction so that the portion of cam 64 against which the locking bolt back plate 54 is pressed by the spring assembly 50 continuously moves inwardly within channel portion 42 toward inner boss 12, allowing the locking bolt to move from the position illustrated in FIG. 4c to that illustrated in FIG. 4a when the radial slot 22 in inner boss 12 is axially aligned with the locking bolt 52. If slot 22 was not so aligned, the end of the locking bolt would abut the outer cylindrical surface 18 of the inner boss 12. By turning the steering wheel 29 and thus outer boss 14, the locking bolt 52 is brought into alignment with slot 22 whereupon the locking bolt snaps forwardly into slot 22 under the force of the spring assembly 50 to couple the outer boss 14 to the inner boss 12.

When the anti-theft device 10 is installed on a vehicle, the upper annular surface 31 of the outer boss 14 is welded onto the extended ends of the steel rods 66 within the arms 68 of the steering wheel in the same manner as a steering wheel is normally secured to a steering column in a conventional single boss mounting which is illustrated in FIG. 8. Thus, the dual boss mounting of the present invention does not interfere in any manner with the vehicle's horn, air bag, electrical wires or any other feature which might be carried by the vehicle's steering wheel or steering column. The locking bolt 52 is constructed of high strength steel and is about 0.300 inches in diameter so that it is effectively sheer-proof in its above-described application and thus provides a secure connection between the inner and other bosses 12 and 14.

To secure the anti-theft device 10 on a vehicle equipped with a conventional steering wheel assembly, such as that shown in FIG. 8, the old assembly is simply removed by removing nut 46', plate 44' and sliding the steering wheel and attached boss 14' off the steering column. The inner boss 12 of the present invention is inserted into channel 32 in the outer boss 14 and held therein by aligning slot 22 in the inner boss 12 with the locking bolt 52 and extending bolt 52 into slot 22 with key 62. The secured assembly is then inserted over the steering wheel column 17 with the ribs 24 on inner boss 12 mating with the splines 26 on the end portion 28 of the column. The new mounting plate 44 is then placed about the threaded end portion 48 of the steering wheel column 17 and over the inner boss 12 and adjacent bearings 35 and the steering wheel column nut 46 and locking clip are threadably engaged with and tightened about the end portion 48 of the steering wheel column.

The respective parts are preferably sized such that the mounting plate 44 is pressed against the upper surface 13 of the inner boss 12, spacing the underside of plate 44 slightly above (about 0.001 in.) the adjacent bearing 35 and the upper surface thereof slightly below the upper surface 31 of the outer boss. The perimeter edge of plate 44 is also spaced slightly inwardly of the upper end of the cylindrical wall defining channel 32 in the outer boss. The bearing retention flange 23 at the lower end of inner boss 12 is similarly spaced from the lower surface of the lower of bearings 35 and from the lower end of the cylindrical wall defining chamber 32 and is flush with the underside of outer boss 14. When the locking bolt 52 is retracted by means of key 62, cam 64 and spring assembly 50, the outer boss 14 and the steering wheel 29 affixed thereto are thus free-wheeling on and about inner boss 12 unimpeded by the inner boss and mounting plate 44. When the cam 64 is rotated inwardly by key 62 and locking bolt 52 is brought into alignment with the radial slot 22 in the inner boss 12 by the rotation of the steering wheel about the inner boss, the locking bolt 52 is urged forwardly into slot 22, again operatively connecting the steering wheel to the steering column so that the steering wheel can be used to control the vehicle.

To prevent unauthorized removal of the steering wheel column nut 46 which would enable one to disassemble and thus circumvent the anti-theft device 10 by replacing the device with a conventional assembly such as that shown in FIG. 8, nut 46 is protected by a tamper-proof cap 49. Cap 49 is formed of case-hardened steel and covers nut 46 and any locking clip employed therewith and includes a radial skirt portion 47 which extends over the interface between plate 44 and outer boss 14. The underside of the skirt portion of cap 49 abuts and is flush with the upper surface 31 of the outer boss 14 to prevent the insertion of a destructive tool either under cap 49 or into the small area between the perimeter of plate 44 and boss 14. Cap 49 is fixed in place by a plurality of bolts 69 with snap-off heads. Bolts 69 extend through the skirt portion of the cap and secure cap 49 to boss 14 by threaded engagement therewith as seen in FIGS. 3, 6 and 7. Bolts 69 are configured such that upon tightening, the head drive portions 71 of the bolts will break off after a maximum tightening torque is exceeded leaving only a rounded exposed end 73 as seen in FIG. 6. As the bolts are formed of case-hardened steel, they cannot be readily removed by a prospective thief to gain access to nut 46.

To prevent one from disabling the looking mechanism 16 by drilling through the exposed end of key engaging portion 60 of the mechanism and removing portion 60 so that the spring assembly 50 will urge the locking bolt 52 to the locked position, the outer end thereof is both case-hardened and provided with a rounded surface 61. To prevent the vehicle from being inadvertently started when the steering wheel is not operatively connected to the steering column, an ignition inhibitor switch 70 is mounted within inner boss 12 which, in the open position, prevents actuation of the starter motor by the vehicle's ignition switch. As seen in FIGS. 5 and 6, the inhibitor switch 70 is closed by the locking bolt 52 when the bolt projects into channel 22 and depresses switch button 72 as the bolt 52 rides thereover. Depressing button 72 closes the switch 70 and in turn closes the electrical circuit between the ignition switch and the starter motor.

The device 10 of the present invention thus effectively disables a motor vehicle by interrupting the operative connection of the steering wheel to the steering column. When the vehicle is left with the locking mechanism 16 in the retracted or unlocked mode, the steering wheel is free-wheeling and useless. Thus, the use of destructive force on device 10 would simply leave the steering wheel disengaged from the steering column and the vehicle effectively disabled. The inhibitor switch 70 prevents the inadvertent starting of the vehicle's engine with the steering wheel disengaged. If a thief were to circumvent the inhibitor switch by "hot wiring" the engine, he or she still could not control the vehicle due to lack of an operative connection between the steering column and steering wheel which can only be obtained through the use of the singularly configured key 62. While the inhibitor switch provides additional protection against theft, it is primarily a safety switch in the event one were to try and start their engine without first locking the anti-theft device.

It is to be understood that different locking mechanisms and configurations could be employed in the present invention to selectively couple and uncouple the inner and outer bosses. Other changes and modifications could also be made in the present invention without departing from the spirit and scope thereof. Insofar as—such changes and modifications are within the purview of the appended claims, they are to be considered as part of the present invention.

We claim:

1. An anti-theft device for motor vehicles which selectively disables the vehicle by interrupting the operative connection of a steering wheel to a steering column, said device comprising a first member adapted to be fixed to the steering wheel, a second member adapted to be fixed to the steering column, said first member cooperating with said second member to define a rotatable mounting of the steering wheel on the steering column, a locking mechanism carried by one of said members, said mechanism being key actuated between a locking position and an unlocking position for selectively coupling and uncoupling said first member to and from said second member when said first member is in radial alignment with said second member and including spring actuated means for automatically coupling said first member to said second member upon said locking mechanism being actuated to the locking position and said first member subsequently rotated into radial alignment with said second member.

2. The device of claim 1 wherein said locking mechanism includes a locking bolt, said bolt extending between and coupling said first member to said second member when said locking mechanism is in said locking position and said first member is in radial alignment with said second member, said bolt being disposed solely within said one member in said unlocking position such that the steering wheel is rotatable about and with respect to the steering column so as to disable the vehicle, and biasing means for extending said locking bolt between said first and second members when said first member is rotated into radial alignment with said second member with said locking mechanism in said locking position.

3. The device of claim 1 wherein said first member is rotatably mounted on and about said second member and said locking mechanism is carried by said first member and comprising a locking bolt movable between a retracted position within said first member and an extended position wherein said bolt engages said second member and couples said first member to said second member, and wherein said automatic coupling means comprises a biasing means for continuously urging said bolt to said extended position, a key actuated camming member movable between a first position wherein said locking mechanism is in said unlocking position and a second position wherein said locking member is in said locking position, in said first position, said camming member operatively engages said bolt and holds said bolt in said retracted position and in said second position, said camming member releases said bolt whereby said biasing means moves said bolt to said extended position upon said first member being moved into radial alignment with said second member, and key means for actuating said camming member.

4. An anti-theft device for motor vehicles which selectively disables the vehicle by interrupting the operative connection of a steering wheel to a steering column, said device comprising a first member adapted to be fixed to the steering wheel, a second member adapted to be fixed to the steering column, said first member cooperating with said second member to define a rotatable mounting of the steering wheel on the steering column, a locking mechanism carried by one of said members, said mechanism being key actuated between a locking position and an unlocking position for selectively coupling and uncoupling said first member to and from said second member, said mechanism including a bolt movable between a retracted position within said first member and an extended position wherein said bolt engages said second member thereby coupling said first member to said second member, a spring member continually urging said bolt to said extended position, a camming member movable between a first position and a second position, in said first position said camming member operatively engages said bolt and maintains said bolt in said retracted position and said locking mechanism in said unlocked position and in said second position said camming member is operatively disengaged from said bolt such that upon rotating said first member into radial alignment with said second member with said locking mechanism in said locking position, said spring member automatically urges said bolt to said extended position, coupling said first member to said second member, and a key means for moving said camming member between said first position and said second position.

5. An anti-theft device for motor vehicles which selectively disables the vehicle by interrupting the operative connection of a steering wheel to a steering column, said device comprising an outer boss adapted to be fixed to the steering wheel and defining a first channel axially disposed therein and a second channel communicating with said first channel, an inner cylindrical boss disposed within said first channel such that said outer boss is freely rotatable on and about said inner boss, said inner boss being mountable on and engagable with the steering column such that rotation of the inner boss is imparted to the column, means for maintaining said outer boss on said inner boss, and a locking mechanism disposed in said second channel in said outer boss and being key actuated between a locking position and an unlocking position for selectively coupling and uncoupling said outer boss to and from said inner boss, said locking mechanism including a bolt movable between a retracted position within said outer boss and an extended position wherein said bolt engages said inner boss thereby coupling said outer boss to said inner boss, a spring member continually urging said bolt to said extended position, a camming member movable between a first position and a second position, in said first position said camming member operatively engages said bolt and maintains said bolt in said retracted position and said locking mechanism in said unlocked position and in said second position said camming member is operatively disengaged from said bolt such that upon rotating said outer boss into radial alignment with said inner boss with said locking mechanism in said locking position, said spring member automatically urges said bolt to said extended position, coupling said outer boss to said inner boss, and a key means for moving said camming member between said first position and said second position.

6. An anti-theft device for motor vehicles which selectively disables the vehicle by interrupting the operative connection of a steering wheel to a steering column, said device comprising a first member adapted to be fixed to the steering wheel, a second member adapted to be fixed to the steering column, said first member cooperating with said second member to define a rotatable mounting of the steering wheel on the steering column, and a locking mechanism carried by one of said members for selectively coupling and uncoupling said first member to and from said second member such that when said first member is coupled to said second member, the steering wheel is operatively connected to the steering column and rotation of said steering wheel is imparted to said steering column and when said first member is uncoupled from said second member, rotation of said steering wheel is not imparted to said steering column and the vehicle is disabled, said locking mechanism comprising a bolt movable between a retracted position within one of said members and an extended position wherein said bolt engages the other of said members and couples said first member to said second member, biasing means for urging said bolt to said extended position, a camming member operatively connected to said bolt and said biasing means and movable between a first position and a second position for selectively engaging said bolt moving said bolt from said extended position to said retracted position and maintaining said bolt in said retracted position upon said camming member being moved to said first position and, upon being moved to said second position, said cam member is operatively disengaged from said bolt such that upon rotating said first member into radial alignment with said second member with said camming member in said second position, said biasing means automatically urges said bolt to said extended position, coupling said first member to said second member.

* * * * *